(12) United States Patent
Du et al.

(10) Patent No.: US 10,946,631 B2
(45) Date of Patent: Mar. 16, 2021

(54) THERMOPLASTIC COMPOSITE LAMINATE AND ARTICLES MANUFACTURED THEREFROM

(71) Applicant: DUPONT SAFETY & CONSTRUCTION, INC., Wilmington, DE (US)

(72) Inventors: Min Du, Shanghai (CN); Qing Liang, Shanghai (CN); Tao Song, Shanghai (CN)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 478 days.

(21) Appl. No.: 16/061,549

(22) PCT Filed: Dec. 8, 2016

(86) PCT No.: PCT/US2016/065555
§ 371 (c)(1),
(2) Date: Jun. 12, 2018

(87) PCT Pub. No.: WO2017/105995
PCT Pub. Date: Jun. 22, 2017

(65) Prior Publication Data
US 2020/0262187 A1   Aug. 20, 2020

(30) Foreign Application Priority Data
Dec. 14, 2015  (CN) ......................... 201510924982.8

(51) Int. Cl.
| | | |
|---|---|---|
| *B32B 27/12* | (2006.01) | |
| *B32B 7/022* | (2019.01) | |
| *B32B 5/02* | (2006.01) | |
| *B32B 7/12* | (2006.01) | |
| *B32B 27/02* | (2006.01) | |
| *B32B 27/34* | (2006.01) | |
| *B32B 27/36* | (2006.01) | |

(52) U.S. Cl.
CPC ............... *B32B 27/12* (2013.01); *B32B 5/02* (2013.01); *B32B 7/022* (2019.01); *B32B 7/12* (2013.01);
(Continued)

(58) Field of Classification Search
CPC ... B32B 27/12; B32B 7/12; Y10T 428/24942; Y10T 428/2495
(Continued)

(56) References Cited

U.S. PATENT DOCUMENTS

| | | |
|---|---|---|
| 3,063,966 A | 11/1962 | Kwolek et al. |
| 3,094,511 A | 6/1963 | Hill, Jr. et al. |

(Continued)

FOREIGN PATENT DOCUMENTS

| | | |
|---|---|---|
| CN | 1389604 A | 1/2003 |
| CN | 204172454 U | 2/2015 |
| JP | H11277687 A | 10/1999 |
| WO | 2015184240 A1 | 12/2015 |

OTHER PUBLICATIONS

International Seqarch Report dated Feb. 24, 2017 for PCT/US2016/065555 filed on Dec. 8, 2016. ISA/EPO, Authorized officer: Girard, Sarah.

*Primary Examiner* — Betelhem Shewareged

(57) ABSTRACT

Disclosed are thermoplastic composite laminates comprising in order of: (a) a top layer composed of at least one polycarbonate sheet; (b) a fabric layer composed of a fabric comprising aromatic polyamide fibers and an adhesion aid; and (c) a bottom layer composed of at least one polycarbonate sheet; wherein the adhesion aid comprises polycarbonate oligomers having a weight average molecular weight of about 6500 or less.

Also disclosed are articles comprising or produced from the thermoplastic composite laminates.

11 Claims, 1 Drawing Sheet

(52) U.S. Cl.
CPC .............. *B32B 27/02* (2013.01); *B32B 27/34* (2013.01); *B32B 27/365* (2013.01); *B32B 2307/542* (2013.01); *B32B 2307/72* (2013.01); *B32B 2307/732* (2013.01); *Y10T 428/2495* (2015.01); *Y10T 428/24942* (2015.01)

(58) Field of Classification Search
USPC ......................................................... 428/213
See application file for complete search history.

(56) References Cited

U.S. PATENT DOCUMENTS

| | | |
|---|---|---|
| 3,227,793 A | 1/1966 | Cipriani |
| 3,287,324 A | 11/1966 | Sweeny |
| 3,354,127 A | 11/1967 | Hill, Jr. et al. |
| 3,414,645 A | 12/1968 | Morgan, Jr. |
| 3,673,143 A | 6/1972 | Bair et al. |
| 3,767,756 A | 10/1973 | Blades |
| 3,819,587 A | 6/1974 | Kwoleck |
| 3,869,429 A | 3/1975 | Blades |
| 3,869,430 A | 3/1975 | Blades |
| 4,172,938 A | 10/1979 | Mera et al. |
| 5,667,743 A | 9/1997 | Tai et al. |
| 2013/0216744 A1 | 8/2013 | Liao |
| 2015/0033935 A1* | 2/2015 | Boyer ..................... B32B 27/36 89/36.02 |
| 2020/0262187 A1* | 8/2020 | Du ........................... B32B 7/12 |

* cited by examiner

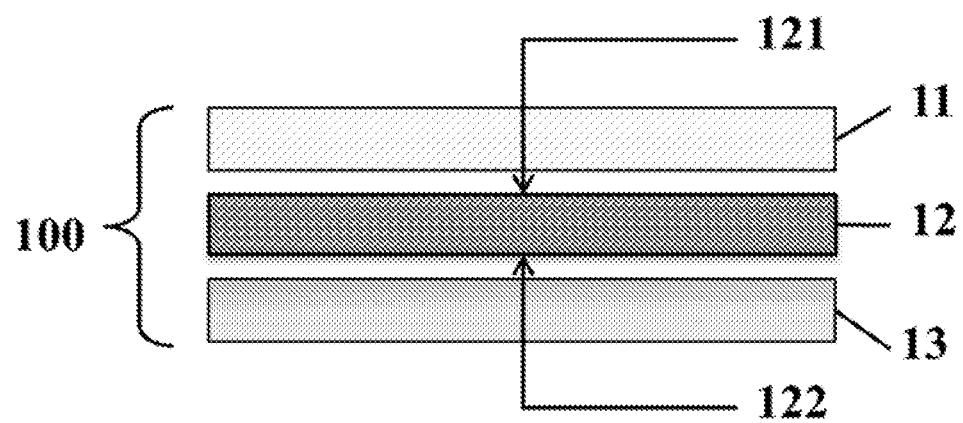

THERMOPLASTIC COMPOSITE LAMINATE AND ARTICLES MANUFACTURED THEREFROM

FIELD OF THE INVENTION

This invention relates to thermoplastic composite laminates having improved bonding strength, and articles made therefrom, having utility for housing or protective covers for mobile electronic devices.

BACKGROUND OF THE INVENTION

Recently, polycarbonate resin has been used widely as the housing or protective cover for luggage and electric & electronic devices due to its durability, strength, and aesthetically appealing as well as being lightweight. In some applications such as sport products and industry products that demand higher impact resistance, composite laminates contain a polycarbonate sheet as outer shell and a layer of reinforcing fabric composed of aromatic polyamide fibers seems to be a good solution. Because composite materials composed of thermoset resin and reinforcing fabric layers made of aromatic polyamide fibers are well known to boost the impact resistance of these composite materials.

One technical challenge is that the aromatic polyamide fibers are surface inert, especially to polycarbonate resin. As the bonding strength between the polycarbonate resin and the fabric composed of aromatic polyamide fibers is insufficient, the thermoplastic composite laminate as compared to the thermoset composite laminate may exhibit inferior mechanical properties and delamination problem.

One approach is to pretreat the inert aromatic polyamide fibers with a surface activation agent, and use tie layers to ensure excellent bonding between the polycarbonate sheet and the reinforcing fabric layer, thus to avoid the delamination problem. For example, CN204172454U discloses thermoplastic composite laminates comprising in order of: (a) a top layer composed of at least one thermoplastic film; (b) a first tie layer; (c) a fabric layer composed of a fabric comprising aromatic polyamide fibers and a surface activation agent; (d) a second tie layer; and (e) a bottom layer composed of at least one thermoplastic film.

There remains an ongoing need for technical solutions of the composite laminates of this invention having improved bonding strength and good mechanical properties.

SUMMARY OF THE INVENTION

This invention provides a thermoplastic composite laminate comprising in order of:
 (a) a top layer composed of at least one polycarbonate sheet;
 (b) a fabric layer composed of a fabric comprising aromatic polyamide fibers and an adhesion aid; and
 (c) a bottom layer composed of at least one polycarbonate sheet;
 wherein
 the top layer (a) is bound to the first surface of the fabric layer (b), and the bottom layer (c) is bound to the second surface of the fabric layer (b);
 the aromatic polyamide fibers are produced from poly(p-phenylene terephthalamide) homopolymer, poly(p-phenylene terephthalamide) copolymer, poly(m-phenylene isophthalamide) homopolymer, poly(m-phenylene isophthalamide) copolymer, polysulfonamide homopolymer, polysulfonamide copolymer, or a mixture thereof;
 the adhesion aid comprises polycarbonate oligomers derived from degradation of polycarbonate resin, and the polycarbonate oligomers have a weight average molecular weight ($M_w$) of about 6500 or less; and
 the thermoplastic composite laminate has an increase in the shear strength of about 30% or more as compared to that of a comparative laminate having the same fabric without the adhesion aid for the fabric layer (b), wherein the shear strength is measured according to the method of GB7124.

This invention also provides articles comprising the thermoplastic composite laminates of the present invention, wherein the articles are housings or protective covers for mobile electronic devices, shells for luggage, decorative parts for auto control panels, or face sheets for snowboards.

BRIEF DESCRIPTION OF THE DRAWINGS

FIG. 1 shows an expanded side view of one embodiment of the present composite laminate 100, which has a layer construction of: (a) a top layer 11, (b) a fabric layer 12, and (c) a bottom layer 13, wherein the fabric layer (b) has a first surface 121 and a second surface 122, the top layer (a) is bound to the first surface of the fabric layer (b), and the bottom layer (c) is bound to the second surface of the fabric layer (b).

DETAILS OF THE INVENTION

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

As used herein, the term "produced from" is synonymous to "comprising". As used herein, the terms "comprises," "comprising," "includes," "including," "has," "having," "contains" or "containing," or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim, such a phrase would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally discussed, provided that these additional materials, steps features, components, or elements do not materially affect the basic and novel characteristic(s) of the claimed invention. The term "consisting essentially of" occupies a middle ground between "comprising" and "consisting of".

The term "comprising" is intended to include embodiments encompassed by the terms "consisting essentially of" and "consisting of". Similarly, the term "consisting essentially of" is intended to include embodiments encompassed by the term "consisting of".

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1 to 5" is recited, the recited range should be construed as including ranges "1 to 4", "1 to 3", "1-2", "1-2 & 4-5", "1-3 & 5", and the like. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and B are true (or present).

"Mol %" or "mole %" refers to mole percent.

In describing and/or claiming this invention, the term "homopolymer" refers to a polymer derived from polymerization of one species of repeating unit. For example, the term "poly (p-phenylene terephthalamide) homopolymer" refers to a polymer consisting essentially one species of repeat unit of p-phenylene terephthalamide.

As used herein, the term "copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

As used herein, the term "fiber" is defined as a relatively flexible, elongate body having a high ratio of length to the width of the cross-sectional area perpendicular to that length. The fiber cross section can be any shape such as circular, flat or oblong but is typically circular. The fiber cross section can be solid or hollow, preferably, solid. Herein, the term "filament" or "continuous filament" is used interchangeably with the term "fiber." A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. As used herein, the term "yarn" is defined as a single strand consisting of multiple fibers.

The diameter of fibers is usually characterized as a linear density termed "denier" or "dtex"; "denier" is the weight in grams of 9000 meters of fiber, and "dtex" is the weight in grams of 10,000 meters of fiber.

As used herein, a "layer" describes a generally planar arrangement of polycarbonate sheets and the fabric.

Embodiments of the present invention as described in the Summary of the Invention include any other embodiments described herein, can be combined in any manner, and the descriptions of variables in the embodiments pertain not only to the composite laminate of the present invention, but also to the articles made therefrom.

The invention is described in detail herein under.

Polycarbonate Sheet

In the present invention, polycarbonate sheet suitable for use as the top layer (a) or the bottom layer (c) comprises, consists essentially of, consists of, or is produced from polycarbonate resins, preferably aromatic polycarbonate resins.

The aromatic polycarbonate resins used herein are derived from diphenols and carbonate precursors in a solution method or in a melt method, such as those as produced through reaction of a diphenol and phosgene or through inter-esterification of a diphenol and a diphenyl carbonate. Usable diphenols includes, for example, 2,2-bis(4-hydroxyphenyl)propane (i.e. bisphenol A), bis(4-hydroxyphenyl) methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl)oxide, bis(4-hydroxy-phenyl)sulfide, bis(4-hydroxyphenyl)sulfone, bis(4-hydroxyphenyl) sulfoxide, bis(4-hydroxyphenyl)ether, bis(4-hydroxyphenyl)ketone, etc. Other diphenols such as hydroquinone, resorcinol, catechol and the like are also usable in the invention. The diphenols mentioned herein may be used either singly or combined. The carbonate precursors for use in the invention include, for example, carbonyl halides, carbonyl esters, haloformates, phosgene, diphenol dihaloformates, diphenyl carbonate, dimethyl carbonate, diethyl carbonate, etc.

In one embodiment, the polycarbonate sheet suitable for use as the top layer (a) or the bottom layer (c) comprises, consists essentially of, consists of, or is produced from bisphenol A type polycarbonate resins of general formula of 1:

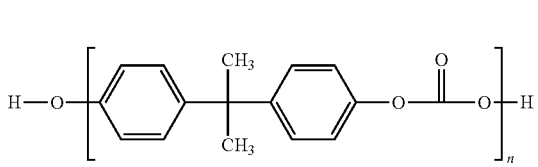

where n is an integer of from about 50 to about 200.

Such bisphenol A type polycarbonate (BPA-PC) resins are known and can be easily obtained from an aromatic dihydroxy compound or the derivative thereof as main raw material by the conventional phosgene method or ester exchange reaction method. Industrial BPA-PC for injection molding and extrusion have an weight average molecular weight ($M_w$) of 15000-50000.

Suitable polycarbonate resins can be purchased from commercial sources such as MAKROLON™ from Bayer, LEXAN® from SABIC, PANLITE® from Teijin, XANTAR® from DSM, IUPILON® from Mitsubishi, and CALIBER® from Dow.

Polycarbonate resins described above can be melted and processed into a sheet by blowing, casting, or extrusion molding. Because the manufacturing processes for polycarbonate sheets are well known to one skilled in the art, the disclosure of which is omitted herein for the interest of brevity.

The term "sheet" is used herein to refer to a continuous thin flat structure with a uniform thickness. In general, a sheet may have a thickness greater than about 0.05 mm. The polycarbonate sheets suitable for use as the top layer (a) or the bottom layer (c) may each independently have a thickness of from about 0.05 mm to about 5 mm, or from about 0.1 mm to about 3 mm, or from about 0.15 mm to about 1 mm. While such thicknesses are preferred, it is to be understood that other thicknesses may be produced to satisfy a particular need and yet fall within the scope of the present invention.

In one embodiment, the top layer (a) and the bottom layer (c) each independently have a thickness of from about 0.05 mm to about 5 mm, or from about 0.1 mm to about 3 mm, or from about 0.15 mm to about 1 mm.

In another embodiment, the polycarbonate sheets for the top layer (a) and the bottom layer (c) of the present thermoplastic composite laminates are the same.

Fabric Layer (b)

As used herein, the fabric for use as the fabric layer (b) prior to treating with an adhesion aid is referred as the "untreated fabric."

In the present invention, the untreated fabric comprises aromatic polyamide fibers produced from poly(p-phenylene terephthalamide) homopolymer, poly(p-phenylene terephthalamide) copolymer, poly(m-phenylene isophthalamide) homopolymer, poly(m-phenylene isophthalamide) copolymer, polysulfonamide homopolymer, polysulfonamide copolymer, and mixture thereof.

Poly(p-phenylene terephthalamide) homopolymer is resulting from mole-for-mole polymerization of p-phenylene diamine (PPD) and terephthaloyl chloride (TCl). Also, poly(p-phenylene terephthalamide) copolymers are resulting from incorporation of as much as 10 mol % of other diamines with the p-phenylene diamine and of as much as 10 mol % of other diacyl chlorides with the terephthaloyl chloride, provided that the other diamines and diacyl chlorides have no reactive groups which interfere with the polymerization reaction. Examples of diamines other than p-phenylene diamine include but not limited to m-phenylene diamine, or 3,4'-diaminodiphenylether (3,4-ODA). Examples of diacyl chlorides other than terephthaloyl chloride include but not limited to isophthaloyl chloride, 2,6-naphthaloyl chloride, chloroterephthaloyl chloride, or dichloroterephthaloyl chloride.

As used herein, the term "p-aramid" refers to poly(p-phenylene terephthalamide) homopolymer and copolymers.

Poly(m-phenylene isophthalamide) homopolymer is resulting from mole-for-mole polymerization of m-phenylene diamine and isophthaloyl chloride. Also, poly(m-phenylene isophthalamide) copolymers are resulting from incorporation of as much as 10 mol % of other diamines with the m-phenylene diamine and of as much as 10 mol % of other diacyl chlorides with the isophthaloyl chloride, provided only that the other diamines and diacyl chlorides have no reactive groups which interfere with the polymerization reaction. Examples of diamines other than m-phenylene diamine include but not limited to p-phenylene diamine or 3,4'-diaminodiphenylether. Examples of diacyl chlorides other than isophthaloyl chloride include but not limited to terephthaloyl chloride, 2,6-naphthaloyl chloride, chloroterephthaloyl chloride, or dichloroterephthaloyl chloride.

As used herein, the term "m-aramid" refers to poly(m-phenylene isophthalamide) homopolymer and copolymers.

Polysulfonamide homopolymers may be resulting from mole-for-mole polymerization of a sulfonyl group containing diamine such as 4,4'-diaminodiphenylsulfone (p-DDS) or 3,3'-diaminodiphenylsulfone (m-DDS), and a diacyl chloride such as terephthaloyl chloride or isophthaloyl chloride.

Polysulfonamide copolymers include, for example, copolymers resulting from a dimanie such as p-DDS and a mixture of terephthaloyl chloride and other diacyl chlorides (e.g., isophthaloyl chloride); and copolymers resulting from a diacyl chloride such as terephthaloyl chloride and a mixture of diamines such as p-DDS, m-DDS, and as much as 10 mol % of other diamine (e.g., p-phenylene diamine, or m-phenylene diamine).

Preferably, polysulfonamide copolymers are derived from p-DDS, m-DDS and terephthaloyl chloride in a mole ratio of 3:1:4.

As used herein, the term "PSA" refers to polysulfonamide homopolymers and copolymers.

The polymers or copolymers of aromatic polyamide described above can be spun into fibers via solution spinning, using a solution of the polymer or copolymer in either the polymerization solvent or another solvent for the polymer or copolymer. Fiber spinning can be accomplished through a multi-hole spinneret by dry spinning, wet spinning, or dry-jet wet spinning (also known as air-gap spinning) to create a multi-filament fiber as is known in the art. The multi-filament fibers after spinning can then be treated to neutralize, wash, dry, or heat treat the fibers as needed using conventional technique to make stable and useful fibers. Exemplary dry, wet and dry-jet wet spinning processes are disclosed U.S. Pat. Nos. 3,063,966; 3,227,793; 3,287,324; 3,414,645; 3,869,430; 3,869,429; 3,767,756; and 5,667,743.

Method of producing aromatic polyamide fibers are disclosed in U.S. Pat. Nos. 4,172,938; 3,869,429; 3,819,587; 3,673,143; 3,354,127; and 3,094,511. Specific methods of making PSA fibers or copolymers containing sulfone amine monomers are disclosed in Chinese Patent Publication No. 1389604A.

Aromatic polyamide fibers are also commercially available, for example, CONEX®, TECHNORA®, and TWARON® from Teijin (Japan), APIAIRE® from Unitika, NOMEX® and KEVLAR® from DuPont, HERACRON® from Kolon Industries, Inc. (Korea), SVM™ and RUSAR™ from Kamensk Volokno JSC of Russia, ARMOS™ from JSC Chim Volokno of Russia, and the like. PSA fiber is commercially available as TANLON™ from Shanghai Tanlon Fiber Co., Ltd. (China).

Finer fibers are more costly to manufacture and to weave, but can produce greater effectiveness per unit weight. Considering the effectiveness and cost, each yarn, which include a plurality of fibers, have a preferred linear density of from about 145 dtex to about 6320 dtex, or from about 440 dtex to about 2640 dtex, or from about 1100 dtex to about 2200 dtex.

In the present invention, the fabric for use as the fabric layer (b) is a woven fabric, a plurality of plies of unidirectional fabric, or a nonwoven fabric. As used herein, the term "nonwoven fabric" refers to any other fabric structure that has been formed from a plurality of randomly oriented chopped or staple fibers, including felts, mats and other structures.

Methods for the production of nonwoven fabrics are well known in the art. For example, carding aromatic polyamide staple fibers to form a web, needle-punching the same, and water-punching at a certain pressure so as to adhering the staple fibers to each other. The aromatic polyamide staple fibers having an average length of from about 5 mm to about 150 mm and an average fineness of the single filament is from about 0.5 dtex to about 10 dtex.

Methods for the production of unidirectional fabrics are well known in the art.

Unidirectional fabric is a fiber web comprising a plurality of fibers aligned in a substantially parallel, unidirectional array. In a preferred unidirectional fabric structure of the invention, a plurality of stacked, overlapping unitapes are formed wherein the parallel fibers of each single ply (unitape) are positioned orthogonally to the parallel fibers of each adjacent single ply relative to the longitudinal fiber direction of each single ply. The stack of overlapping fiber plies can be consolidated under heat and pressure to form a single-layer, monolithic element which has also been referred to in the art as a single-layer, consolidated network.

Unidirectional fabric typically include from 1 to about 6 plies, but may include as many as about 10 plies to about 20 plies as may be desired for various applications. The greater the number of plies translates into greater impact resistance, but also greater weight.

Woven fabrics generally have a plurality of warp yarns running lengthwise in the machine direction, and a plurality of fill yarns running substantially perpendicularly to the warp yarns (i.e., in the cross-machine direction). Any weave construction or pattern may be used, for example, such as plain weave, twill weave, satin weave, basket weave, and the like. The coarseness or fineness of the woven fabric is measured by counting the number of yarns contained in one square inch or square centimeter including both the length (warp) and width (weft) yarns.

Although woven fabrics suitable for the invention have no specific requirement for tightness of weave, a tight weave is preferred except to avoid extremely tight weaves to avoid damage of yarn fibers resulting from the rigors of weaving. Commercially available woven fabrics include 17×17 counts, 20×20 counts, 34×34 counts per square inch.

In one embodiment of the invention, the fabric for use as the fabric layer (b) is a woven fabric, an unidirectional fabric, or a nonwoven fabric. In another embodiment of the invention, the fabric for use as the fabric layer (b) is a woven fabric. In a further embodiment of the invention, the woven fabric is composed of warp fibers and weft fibers of different colors.

In some embodiments, when the polycarbonate sheet of the top layer (a) is transparent, the woven fabric not only can enhance the dimensional instability, but also impart additional aesthetically effect with the see-through weaving pattern and/or colors of the fabric used as the fabric layer (b).

The thickness of the fabric layer (b) of the invention varies depending upon the ultimate use of the composite laminate or article. For example, in composite shell for luggage, in order to achieve a desired areal density of 500 g/m² to 2000 g/m² or less, a total of about 3 plies to about 10 individual plies may be required, wherein the plies may be an unidirectional fabric (with parallel oriented fibers or other arrangements) formed from the aromatic polyamide fibers described herein. Accordingly, the thickness of the fabric for use as the fabric layer (b) will correspond to the thickness of the individual fibers, the weave pattern, and the number of fiber plies incorporated into a unidirectional fabric.

A woven fabric preferably has a thickness of from about 0.03 mm to about 2 mm, or from about 0.1 mm to about 1 mm, or from about 0.15 mm to about 0.5 mm.

An unidirectional fabric, i.e. a single-layer, consolidated network, preferably has a preferred thickness of from about 0.01 mm to about 1 mm, or from about 0.05 mm to about 0.5 mm, or from about 0.075 mm to about 0.3 mm. As used herein, a single-layer, consolidated network typically includes at least two consolidated plies (i.e. two unitapes).

A nonwoven fabric preferably has a thickness of from about 0.025 mm to about 5 mm, or from about 0.05 mm to about 2 mm, or from about 0.075 mm to about 1 mm.

In one embodiment, the thickness of the fabric layer (b) of the present thermoplastic composite laminate is from about 0.01 mm to about 5 mm, or from about 0.05 mm to about 2 mm, or from about 0.1 mm to about 1 mm.

The areal density of the untreated fabric ranges from about 20 g/m² to about 660 g/m², or from about 60 g/m² to about 360 g/m², or from about 100 g/m² to about 260 g/m².

In the present invention, the fabric for use as the fabric layer (b) also comprises an adhesion aid to improve the bonding strength between the fabric and the polycarbonate sheets for the top layer (a) or the bottom layer (c). Applicant unexpectedly discovered that polycarbonate oligomers could effectively function as an adhesion aid. Noted that the polycarbonate oligomers chemically cannot serve as precursors to form polycarbonate polymer under the conditions during fabric application and composite laminating processes.

Suitable polycarbonate oligomers can be obtained by melt transesterification from bisphenol A and diphenyl carbonate, or degradation of polycarbonate polymer in an acid or base catalyzed condition. For the degradation route, polycarbonate polymer may be treated with a solution comprising a base such as NaOH or KOH, and the like, and a suitable solvent at ambient temperature or higher.

Suitable solvents for use in the degradation of polycarbonate polymer are commonly known organic solvents such as methanol, ethanol, 2-propanol, dichloromethane, chloroform, tetrahydrofuran, dimethyl sulfoxide, N,N-dimethylforamide, and mixtures thereof. So long as the polycarbonate polymer at ambient temperature has a solubility of in the solvent(s) of choice being at least 1 gram in about 15 mL, or 10 mL, or 5 mL or less. Additionally, the solvent preferably can also be removed by heating at a temperature no more than 200° C., and the resulting polycarbonate oligomers may be obtained after solvent evaporation.

In one embodiment, the adhesion aid used herein comprises a mixture of polycarbonate oligomers represented by the general formula of 2

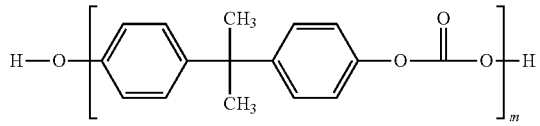

where m is an integer of from about 2 to about 25.

As used herein, the polycarbonate oligomers preferably are obtained from degradation of polycarbonate polymer, said polycarbonate oligomers have a $M_w$ of from about 500 to about 6500; or from about 750 to about 5100; or from about 1000 to about 4000. In other words, the mixture of polycarbonate oligomers is represented by general formula 2, wherein m is an integer of from about 2 to about 25, or from about 3 to about 20, or from about 4 to about 15.

The adhesion aid containing polycarbonate oligomers is preferably mixed with a solvent capable of dissolving or dispersing the polycarbonate oligomers to form a coating composition. Suitable solvent may include methanol, ethanol, 2-propanol, dichloromethane, chloroform, tetrahydrofuran, or mixtures thereof, so long as the solvent does not adversely affect the properties of fabric at the temperature of application.

The amount of the adhesion aid in the coating composition is from about 1 weight % to about 20 weight %, or from about 5 weight % to about 15 weight %, based on the total weight of the coating composition.

Any appropriate application method that would be readily determined by one skilled in the art may be utilized to apply the coating composition. As used herein, the term "coated" is not intended to limit the method by which it is applied onto the fabric. For example, the coating composition may be applied to a woven fabric to form a coated woven fabric, or as another arrangement such unidirectional fabric or nonwoven fabric, to thereby impregnate the fiber layers with the adhesion aid. As used herein, the term "impregnated with" is synonymous with "embedded in" as well as "coated with" or otherwise applied with the coating composition where the polycarbonate oligomers diffuse into the fabric and is not simply on the surfaces of the fabric.

For example, the coating composition may be applied onto to the untreated fabric by spraying, roll coating, direct gravure, Meyer rod and air knife systems, which are well known in the art; followed by drying. Alternatively, the fabric can be transported through the coating composition to substantially coat the fabric, and then dried. In another coating technique, the fabric may be dipped, soaked, or immersed into a bath of the coating composition, and then dried through evaporation or volatilization of the solvent.

The application procedure described above may be repeated several times as required to apply a suitable amount of adhesion aid onto the fabric. If the amount of adhesion aid applied onto the fabric exceed as desired, the treated fabric may be rinsed with water and then dried again. The rinsing and drying steps described above may be repeated several times to obtain a treated fabric containing suitable amount of adhesion aid c for use as the fabric layer (b).

When the fabric for use as the fabric layer (b) is a woven fabric, alternatively, the individual fibers of the woven fabric may be treated with the coating composition prior to or after weaving. Typically, weaving of fabrics is performed prior to coating fibers with the adhesion aid, where the woven fabrics are thereby impregnated with the adhesion aid. However, the invention is not intended to be limited by the stage at which the adhesion aid is applied to the fibers, nor by the means used to apply the adhesion aid.

While it is necessary that the fabric to be applied with the coating composition may be pre-treated with agents such as surfactants that can at least partial removal of the fabric surface finish, or adsorption enhancers that can enhances of a subsequently applied adsorbate, i.e. the adhesion aid, on the fiber surfaces.

In one embodiment, the fabric for use as the fabric layer (b) is prepared by a method comprising: i) applying a coating composition comprising an adhesion aid onto an untreated fabric to obtain a wet fabric; ii) drying the wet fabric at a temperature ranging from ambient temperature to about 150° C. for from about 5 minute to about 180 minutes; iii) optionally, applying the coating composition onto the dried fabric of step ii) or rinsing the dried fabric of step ii), and drying by repeating step ii), wherein step iii) is optionally repeated several times to obtain a treated fabric containing suitable amount of the adhesion aid.

In another embodiment, the coating composition is applied onto the untreated fabric by dipping, soaking, immersing, or spraying.

In a further embodiment, the fabric for the fabric layer (b) is prepared by the method comprising: immersing an untreated fabric in the coating composition containing an adhesion aid composed of polycarbonate oligomers and a solvent; drying at ambient temperature to evaporate most of the solvent; and optionally further drying in an oven at an elevated temperature. There is no special restriction on the soaking/immersing time, as long as the untreated fabric is thoroughly wetted in the coating composition. In one embodiment, the soaking/immersing time is from about 0.05 hours to about 2 hours.

The soaking/immersing temperature is from about 10° C. to about 40° C., preferably at ambient temperature. The oven-drying temperature is from about 80° C. to about 150° C., and the oven-drying time is from about 5 minutes to about 180 minutes.

In one embodiment of the present invention, the fabric for use as the fabric layer (b) contains an adhesion aid in an amount of at least about 5 weight %, or 6 weight %, or 7 weight %, or 8 weight %, or 9 weight %, based on the total weight of the fabric. In another embodiment of the present invention, the fabric for use as the fabric layer (b) contains an adhesion aid in an amount of no more than about 70 weight %, or 60 weight %, or 50 weight %, or 40 weight %, or 30 weight %, based on the total weight of the fabric. In some embodiments of the present invention, the fabric for use as the fabric layer (b) contains an adhesion aid in an amount of about 5 weight % to about 70 weight %, or about 6 weight % to about 50 weight %, or about 7 weight % to about 40 weight %, or about 8 weight % to about 30 weight %, based on the total weight of the fabric.

Preparation of the Thermoplastic Composite Laminate

The thermoplastic composite laminate 100 of the present invention comprises in order of: (a) a top layer 11, (b) a fabric layer 12, and (c) a bottom layer 13, wherein the fabric layer (b) has a first surface 121 and a second surface 122. The top layer (a) is bound to the first surface of the fabric layer (b), and the bottom layer (c) is bound to the second surface of the fabric layer (b) as shown in FIG. 1.

As used herein to describe the structure of a composite laminate, the "/" is used to separate each distinctive layer with the adjacent layer(s) therein. Therefore, the structure of the present thermoplastic composite laminate may be represented as (a)/(b)/(c).

There is no special restriction on methods for preparing the thermoplastic composite laminates in the present invention, and it can be any conventional known method in this field. Suitable methods for preparing the present thermoplastic composite laminate include hot pressing, thermal compression molding, autoclave molding, and double-belt hot melt pressing. Process parameters such as temperatures, pressures, and times for preparing the present thermoplastic composite laminate are generally dependent on the material properties of the polycarbonate sheets and the fabric as well as the preparation method. One skilled in the art can decide suitable process parameters accordingly.

In one embodiment, the present thermoplastic composite laminate is prepared by hot pressing.

Hot pressing may typically be done at a temperature that is at least higher than the melting point of the adhesion aid containing in the a fabric layer (b), and is no more than 50° C. above the melting point of the polycarbonate for the top layer (a) and the bottom layer (c).

In one embodiment, the hot pressing is performed at a temperature ranging from about 100° C. to about 300° C., or from about 150° C. to about 250° C.; at a pressures ranging from about 0.2 MPa to about 17.4 MPa, or from about 0.5

MPa to about 5 MPa; and for from about 0.5 minutes to about 40 minutes, or from about 1 minute to about 20 minutes.

The present thermoplastic composite laminate after hot pressing generally has a total thickness of from about 0.1 mm to about 10 mm, or from about 0.3 mm to about 5 mm, or from about 0.5 mm to about 3 mm. The total thickness of the present thermoplastic composite laminate can be adjusted easily by using polycarbonate sheets for use as the top layer (a) and/or bottom layer (c), and fabric for use as the fabric layer (b) of various thicknesses.

The bonding strength of the present thermoplastic composite laminate is evaluated by the shear strength between the fabric layer (b) and the top layer (a), or between the fabric layer (b) and the bottom layer (c). If a greater shear strength which means that the bonding strength between these layers is higher. As used herein, the term "shear strength" refers to the tensile strength measured according to GB7124 by shearing off the top layer (a) or the bottom layer (c) from the fabric layer (b).

Considering cost and easy production, in the present invention, the polycarbonate sheets for the top layer (a) and bottom layer (c) prefer to be the same. Therefore, the shear strength testing of the thermoplastic composite laminate can be performed on only one side of the fabric layer (b).

The thermoplastic composite laminate of the present invention exhibits an increase of 30% or more in shear strength as compared to that of a comparative laminate having the same fabric without the adhesion aid for use as the fabric layer (b). The thermoplastic composite laminate of the present invention preferably exhibits an increase of 30%, or 60%, or 90% or 120% or more in shear strength as compared to that of a comparative laminate. The thermoplastic composite laminate of the present invention preferably have shear strength of more than 3.6 MPa, or 4.5 MPa or more Additional layer(s) may optionally be applied to the present thermoplastic composite laminate, for example, a layer of ultraviolet protection material may be applied above the top layer (a).

Articles comprise, consist essentially of, consist of, or are produced from the inventive thermoplastic composite laminates have high structural integrity due to their excellent interlayer bonding strength. Furthermore, the inventive thermoplastic composite laminates not only improves the process efficiency through shortened cycle time (i.e. cost saving), but also offers the chance to reprocess as needed for later applications as compared to the thermoset composite laminates.

Articles of the present invention are useful as housings or protective covers for mobile electronic devices, shells for luggage, decorative parts for auto control panels, or face sheets for snowboards.

Examples of mobile electronic devices include handheld computers, tablet computers, mobile phones, e-readers, portable game devices, portable media players, or digital cameras. Examples of mobile phones include but not limited to flip phones, slider phones, radio telephones, cellular phones, smart phones, etc.

Without further elaboration, it is believed that one skilled in the art using the preceding description can utilize the present invention to its fullest extent. The following examples are, therefore, to be construed as merely illustrative, and not limiting of the disclosure in any way whatsoever.

EXAMPLES

The abbreviation "E" stands for "Example" and "CE" stands for "Comparative Example" is followed by a number indicating in which example the thermoplastic composite laminate is prepared. The examples and comparative examples were all prepared and tested in a similar manner.

Materials

Polycarbonate sheet (P1): a polycarbonate sheet purchased from SABIC under trade name LEXAN®8B35; the sheet has a width of 100 cm, a thickness of about 0.175 mm, and a vicar softening temperature of 160° C.

Polycarbonate polymer (P2): Polycarbonate pellet purchased from SABIC under trade name LEXAN® HF1130-111, has a specific gravity of 1.2, a $M_w$ of about 24706 (measured by GPC) and a solubility at ambient temperature of about 1 g per 2 mL of dichloromethane.

Untreated fabric (U1): a plain weave fabric produced from poly(p-phenylene terephthalamide) yarns of 1500 denier (1670 dtex) (KELVAR®, available from DuPont) as warp and weft yarns, size: 7×7 ends/cm$^2$, an areal density of 200 g/m$^2$, purchased from Jiangsu Tianniao High Tech. Co.

Untreated fabric (U2): a twill weave fabric produced from poly(m-phenylene terephthalamide) yarns of 1200 denier (1334 dtex) (NOMEX® white, available from DuPont) for warp and weft yarns, size: 9×9 ends/cm$^2$, an areal density of 245 g/m$^2$, purchased from Chomarat Co.

Comparative Adhesion aid (AA1): acrylated urethane having a density of 1.08 g/mL and a viscosity of 25,000 cP (20 rpm), purchased from DYMAX Corporation under the trade name of Multi-Cure® CN3106-E.

Initiator for AA1: a reaction product mixture of about 60 weight % triethyleneglycol divinyl ether, about 25 weight % epoxy resin, and about 15 weight % butyraldehyde/aniline, 501E, purchased from DYMAX Corporation.

Dichloromethane: $CH_2Cl_2$, CAS No.: 75-09-2, purchased from Sinopharm Chemical Reagent Co, Ltd.

Methyl alcohol: $CH_3OH$, CAS No.: 67-56-1, purchased from Sinopharm Chemical Reagent Co, Ltd.

Sodium hydroxide: NaOH, CAS No.: 1310-73-2, purchased from Sinopharm Chemical Reagent Co, Ltd.

Preparation of Coating Compositions 1-5

Coating composition 1 (CC1): containing dichloromethane without any adhesion aid.

Coating Composition 2 (CC2): 15 g of adhesion aid (AA1) was added to 35 g of acetone and stirred to obtain a coating composition (CC2).

Coating Composition (CC3): In a 3-neck round bottom flask fitted with a condenser, 1 g of sodium hydroxide was added to 50 mL of methanol and 100 mL of dichloromethane and stirred for about 2-5 minutes until dissolving. The basic solution was heated to 40° C., then 12 g of polycarbonate polymer pellets (P2) were added into the mixed solution and stirred for 10 minutes. The resulting clear solution was cooled to room temperature and poured into a separatory funnel and washed with water (about 150 mL each time, for 3 times) to remove the residual sodium hydroxide and methanol. The organic phase containing polycarbonate oligomers was stored in a 250 mL glass bottle with a lid, that was used directly as coating composition 3 (CC3). One sample of CC3 (1 mL) was taken for GPC measurement to determine the $M_w$ and polydispersity. A sample of the polycarbonate polymer pellets (P2) dissolved in dichloromethane was also submitted for GPC analysis. The data are listed in Table 1.

Coating composition 4 (CC4): CC4 was prepared in a similar procedure as described for CC3. A basic solution containing 1 g of sodium hydroxide, 50 mL of methanol and 100 mL of dichloromethane was kept at 23° C. (ambient temperature); polycarbonate polymer pellets (P2) were then added and stirred for 10 minutes. The resulting mixture was washed with deionized water (about 150 mL each time, for 3 times), isolated, stored and to be used directly as coating composition 4 (CC4). One sample of CC4 (1 mL) was taken for GPC measurement to determine the $M_w$ and polydispersity. The data are listed in Table 1.

Coating composition 5 (CC5): CC5 was prepared in a similar procedure as described for CC3. A basic solution containing 1 g of sodium hydroxide, 50 mL of methyl alcohol and 100 mL of dichloromethane was cooled to 0° C. using an ice bath; polycarbonate polymer pellets (P2) were then added and stirred for 10 minutes. The resulting mixture was washed with deionized water (about 150 mL each time, for 3 times), isolated, stored as coating composition 5 (CC5). One sample of CC5 (1 mL) was taken for GPC measurement to determine the $M_w$ and polydispersity. The data are listed in Table 1.

water bath or the coating composition bath, oven-dried at about 120° C. for another 2 hours and weighted. The application procedure described above might be repeated several times until the fabric for use as fabric layer (b) contains the desired amount of adhesion aid, which would be calculated by the weight increase of the fabric. The amount of adhesion aid (AA weight %) present in each treated fabric was calculated by the equation shown below:

$$AA \text{ weight \%} = [(W_n - W_0)/W_n] \times 100$$

where $W_0$ is the weight of the fabric before treatment, and $W_n$ is the weight of the fabric after final treatment.

The treatment details and amount of adhesion aid of each fabric for use as fabric layer (b) in the comparative examples and working examples were specified in Table 2.

TABLE 2

| Fabric number | Coating Composition | Untreated Fabric | AA weight % | Treatment process |
|---|---|---|---|---|
| F1 | CC1: dichloromethane | U1 | 0 | Soak (10 min)[a]-dry[b] |
| F2 | CC2: acrylated urethane | U1 | 9.6 | Soak (10 min)-dry-rinse (5 min)-dry |
| F3 | CC3: PC degraded at 40° C. | U1 | 4.9 | Soak (10 min)-dry-rinse (5 min)-dry-rinse (5 min)-dry |
| F4 | CC3: PC degraded at 40° C. | U1 | 9.2 | Soak (10 min)-dry-rinse (5 min)-dry |
| F5 | CC3: PC degraded at 40° C. | U1 | 19.8 | Soak (10 min)-dry-soak (5 min)-dry |
| F6 | CC3: PC degraded at 40° C. | U1 | 28.4 | Soak (10 min)-dry-soak (5 min)-dry-soak (5 min)-dry |
| F7 | CC3: PC degraded at 40° C. | U1 | 37.3 | Soak (10 min)-dry-soak (5 min)-dry-soak (5 min)-dry-soak (5 min)-dry |
| F8 | CC4: PC degraded at 23° C. | U1 | 10.1 | Soak (10 min)-dry-rinse (5 min)-dry-rinse (5 min)-dry |
| F9 | CC5: PC degraded at 0° C. | U1 | 9.5 | Soak (10 min)-dry-rinse (5 min)-dry |
| F10 | CC1: dichloromethane | U2 | 0 | Soak (10 min)-dry |
| F11 | CC3: PC degraded at 40° C. | U2 | 10.0 | Soak (10 min)-dry-rinse (5 min)-dry |

[a]the duration in "( )" indicates the duration of each step.
[b]the "-" is used to separate each step of the treatment process.

TABLE 1

| Coating composition | P2 | CC3 | CC4 | CC5 |
|---|---|---|---|---|
| Adhesion aid: polycarbonate oligomers | — | AA2 | AA3 | AA4 |
| Degradation temperature (° C.) | — | 40 | 23 | 0 |
| $M_w$ | 24706 | 1161 | 2027 | 5663 |
| Polydispersity | 1.74 | 1.31 | 1.63 | 4.74 |

Step A. Fabric Treatment

A piece of the untreated fabric (15 cm×15 cm) was dried in oven at about 120° C. for 2 hours, and then was put on a balance for measuring its untreated weight ($W_0$). The untreated fabric was fully immersed in an alumina tray containing the specified coating composition (about 20 mL) at ambient temperature for about 10 minutes, and then removed from the coating composition bath. The wet fabric was hung vertically until no liquid dripping for about 30 seconds, then put into an oven and dried at about 120° C. for 2 hours. The dried fabric was cooled to room temperature and weighed.

If the weight increase of the treated fabric was more than desired, the treated fabric was immersed in a water bath (about 20 mL) for about 5 minutes; whereas if the weight increase of the treated fabric was less than desired, the treated fabric was immersed in the same coating composition bath at ambient temperature for about 5 minutes. Afterwards, the treated fabric was removed from either the Step B. Hot Pressing The laminates of the working examples and comparative examples were prepared by hot pressing using a hot pressing machine (manufactured by PHI) equipped with a mold (composed of two 35 cm×35 cm×1.5 cm stainless steel plates).

Polycarbonate sheets for the top layer (a) and the bottom layer (c) were cut into a square of 15 cm×15 cm, and the treated fabrics obtained from Step A for use as the fabric layer (b) and two pieces of release paper (35 cm×35 cm) were stacked as described below.

Firstly, the mold was pre-heated in the hot pressing machine to 190° C. After taking out the mold from the hot pressing machine, the mold was opened and set aside the top plate was set aside. A first piece of release paper was placed onto the base plate, followed by placing the polycarbonate sheet for use as the top layer (a) in the center of the mold. Afterwards, the fabric for use as the fabric layer (b), and the polycarbonate sheet for use as the upper layer (c) were laid in sequence according to the distinct layers of each laminate samples as specified in Tables 3-4. After these layers were laid in place to obtain a preform, the second release paper (35 cm×35 cm) was placed over the preform, and the top plate of the mold was put back in place to close the mold. The closed mold was put back into the hot pressing machine.

Each laminate sample was hot pressed at 190° C. with a pressure of 1 MPa for 10 minutes. After hot pressing, the mold was taken out of the hot press machine, the top plate was removed from the mold, followed by removal of the second release paper. The thermoplastic composite laminate was removed from the mold, separated from the first release paper, and cooled to ambient temperature.

For CE2, each surface of the top layer (a) and the bottom layer (c) that would contact the fabric layer (b) was applied with a brush for about 0.75 g of the initiator for AA1 right before preform assembling.

Test Methods

Molecular weight measurement: $M_w$ of the coating compositions CC1 and CC3-CC5 were measured by Gel Permeation Chromatography (GPC), on a Waters eAlliance 2695/2414 with RI detector and a Stryragel® HR 1 column (sold by Waters, 5 μm, 7.8 mm×300 mm) using tetrahydrofuran as the eluent (30° C., flow rate was 1 mL/min) and polystyrene as the standards.

Thickness measurement: the thickness of the laminate sample was determined by a digital micrometer. Each specimen was measured 6-10 times at different spots and the results were averaged and reported in Tables 3-4.

Shear strength test: each laminate sample was cut to obtain 5 test specimens (i.e. a rectangle of 15 mm×25.4 mm) by a laser cutting machine (purchased from Han's Laser Technology Industry Group Co. Ltd., model: P060). Each test specimen was fixed on two steel plates with a size of 100 mm (L)×25.4 mm (W). The top layer (a) and bottom layer (c) of the test specimen were bonded to the two steel plates separately with epoxy resin, and the epoxy resin was cured for at least 24 hours. Using an Instron® materials test machine (manufactured by Instron® company, model: 5567), the steel plates affixed with the test sample were locked between the upper and bottom clamps (2716-015) and clamped tightly. The upper clamp moved with a speed of 2 mm/min and a load of 5 kN according to GB7124, and the shear strength was measured and recorded in unit of N/25.4 mm, the shear strength (in MPa) was calculated by dividing the shear force data by the test sample area. The shear strength data of five test specimens were averaged and listed in Tables 3-4.

Improvement of shear strength (ΔS): the improvement of shear strength was calculated by the equation shown below:

$$\Delta S\% = [(S_n - S_0)/S_0] \times 100$$

where $S_0$ is the shear strength of a reference example; and $S_n$ is the shear strength of a comparing example.

TABLE 3

| Sample ID | Laminate Construction: (a)/(b)/(c)[b] | Thickness (mm) | Amount of Adhesion Aid of the fabric | Shear Strength (MPa) | Improvement of Shear Strength (%) |
|---|---|---|---|---|---|
| CE1*,[a] | P1/F1/P1 | 0.54 | 0 | 2.83 | — |
| CE2 | P1/F2/P1 | 0.48 | 9.6 | 3.46 | 22 |
| E1 | P1/F3/P1 | 0.51 | 4.9 | 3.98 | 41 |
| E2 | P1/F4/P1 | 0.53 | 9.2 | 7.99 | 182 |
| E3 | P1/F5/P1 | 0.52 | 19.8 | 6.24 | 121 |
| E4 | P1/F6/P1 | 0.51 | 28.4 | 5.46 | 93 |
| E5 | P1/F7/P1 | 0.53 | 37.3 | 4.77 | 69 |
| E6 | P1/F8/P1 | 0.54 | 10.1 | 7.29 | 158 |
| E7 | P1/F9/P1 | 0.53 | 9.5 | 3.87 | 37 |

[a]"*" indicates the comparative example is the reference example used for the shear strength improvement calculation.
[b]the "/" is used to separate each distinctive layer with the adjacent layer(s).

From the results of Table 3, the followings are evident.

Comparison between the shear strength data of E1, CE2 and CE1, the laminate of CE2 having a fabric treated with acrylated urethane (9.6 weight %) provided an increase of 22% in the shear strength than that of the laminate of CE1; whereas the laminate of E1 having a fabric treated with polycarbonate oligomers (4.9 weight %) showed an increase of 41%. The results suggest that for fabric treated with almost twice the amount of acrylated urethane, a commonly known adhesion aid, is less effective than the one treated with polycarbonate oligomers in improving the bonding strength between the aromatic polyamide fabric and the polycarbonate sheets for the top layer (a) and bottom layer (c). Therefore, one can attribute the bonding strength improvement found of the inventive thermoplastic composite laminate (E1) versus that of CE1 to the use of polycarbonate oligomers as adhesion aid.

The shear strength data of E1-E5 also demonstrated that by varying the amount of polycarbonate oligomers present in the fabric for use as the fabric layer (b), the resulting shear strength increase found in the present thermoplastic composite laminates also varied (41%-182%), though not proportionally.

Comparison between the shear strength data of E7, E6 and E2 versus CE1, the thermoplastic composite laminate of E7, E6 and E2, each has a fabric containing about 10 weight % of an adhesion aid (CC5, CC4, or CC3 respectively) for use as the fabric layer (b), all demonstrated significant increase in the shear strength (37%-182%) as compared to that of the laminates of CE1. Therefore, the Mw of the polycarbonate oligomers also plays an important role in improving the bonding strength between the polycarbonate sheets (a) and (c) and fabric composed of p-aramid fibers used as the fabric layer (b).

In one embodiment of the present invention, the thermoplastic composite laminate comprises in order of:
(a) a top layer composed of at least one polycarbonate sheet;
(b) a fabric layer composed of a fabric comprising aromatic polyamide fibers and an adhesion aid; and
(c) a bottom layer composed of at least one polycarbonate sheet;
wherein
the top layer (a) is bound to the first surface of the fabric layer (b), and the bottom layer (c) is bound to the second surface of the fabric layer (b);
the aromatic polyamide fibers are produced from poly(p-phenylene terephthalamide) homopolymer, poly(p-phenylene terephthalamide) copolymer, or a mixture thereof;
the adhesion aid comprises polycarbonate oligomers having a weight average molecular weight (Mw) of from about 500 to about 6500, or from about 750 to about 5100, or from about 1000 to about 4000; and
the amount of the adhesion aid present in the fabric is from about 5 weight % to about 70 weight %, or about 6 weight % to about 50 weight %, or about 7 weight % to about 40 weight %, or about 8 weight % to about 30 weight %, based on the total weight of the fabric.

TABLE 4

| Sample ID | Laminate Layer Construction in order of: (a)/(b)/(c)[b] | Thickness (mm) | Shear Strength (MPa) | Improvement of Shear Strength (%) |
|---|---|---|---|---|
| CE3*,[a] | P1/F10/P1 | 0.59 | 1.54 | — |
| E8 | P1/F11/P1 | 0.61 | 4.52 | 193 |

[a]the "*" indicates the comparative example is the reference example used for the shear strength improvement calculation.
[b]the "/" is used to separate each distinctive layer with the adjacent layer(s).

From the results of Table 4, the followings are evident.

Comparison between the shear strength data of CE3 and E8, the laminate of E8 having a fabric treated with polycarbonate oligomers (about 10.0 weight %) surprisingly provided a shear strength increase of 193%.

In one embodiment of the present invention, the thermoplastic composite laminate comprises in order of:
(a) a top layer composed of at least one polycarbonate sheet;
(b) a fabric layer composed of a fabric comprising aromatic polyamide fibers and an adhesion aid; and
(c) a bottom layer composed of at least one polycarbonate sheet;
wherein
the top layer (a) is bound to the first surface of the fabric layer (b), and the bottom layer (c) is bound to the second surface of the fabric layer (b);
the aromatic polyamide fibers are produced from poly(m-phenylene isophthalamide) homopolymer, poly(m-phenylene isophthalamide) copolymer, or a mixture thereof; the adhesion aid comprises polycarbonate oligomers having an average molecular weight (Mw) of from about 500 to about 6500, or from about 750 to about 5100, or from about 1000 to about 4000; and
the amount of the adhesion aid present in the fabric is from about 5 weight % to about 70 weight %, or about 6 weight % to about 50 weight %, or about 7 weight % to about 40 weight %, or about 8 weight % to about 30 weight %, based on the total weight of the fabric.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A thermoplastic composite laminate comprising in order of:
(a) a top layer composed of at least one polycarbonate sheet;
(b) a fabric layer composed of a fabric comprising aromatic polyamide fibers and an adhesion aid; and
(c) a bottom layer composed of at least one polycarbonate sheet;
wherein
the top layer (a) is bound to the first surface of the fabric layer (b), and the bottom layer (c) is bound to the second surface of the fabric layer (b);
the aromatic polyamide fibers are produced from poly(p-phenylene terephthalamide) homopolymer, poly(p-phenylene terephthalamide) copolymer, poly(m-phenylene isophthalamide) homopolymer, poly(m-phenylene isophthalamide) copolymer, polysulfonamide homopolymer, polysulfonamide copolymer, or a mixture thereof;
the adhesion aid comprises polycarbonate oligomers have a weight average molecular weight of about 6500 or less; and
the thermoplastic composite laminate has an increase of about 30% or more in the shear strength as compared to that of a comparative laminate having the same fabric without the adhesion aid for the fabric layer (b), wherein the shear strength is measured according to the method of GB7124.

2. The thermoplastic composite laminate of claim 1, wherein the total thickness of the thermoplastic composite laminate is from about 0.1 mm to about 10 mm.

3. The thermoplastic composite laminate of claim 1, wherein the fabric for the fabric layer (b) contains the adhesion aid in an amount of from about 5 weight % to about 70 weight % of the adhesion aid, and the weight % is based on the total weight of the fabric.

4. The thermoplastic composite laminate of claim 1, wherein the polycarbonate sheet for the top layer (a) and/or the bottom layer (c) comprises bisphenol A type polycarbonate polymers of general formula of 1:

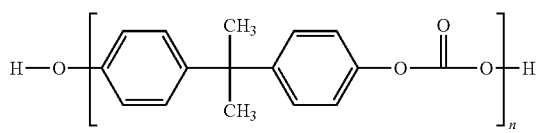

where n is an integer of from about 50 to about 200.

5. The thermoplastic composite laminate of claim 4, wherein the adhesion aid comprises polycarbonate oligomers of general formula of 2:

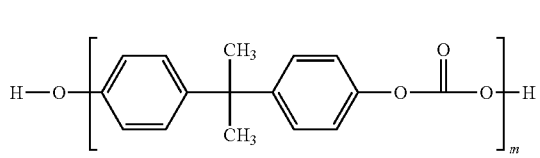

where m is an integer of from about 2 to about 25.

6. The thermoplastic composite laminate of claim 1, wherein the fabric for the fabric layer (b) is produced by a method comprising:
i) applying a coating composition onto an untreated fabric to obtain a wet fabric;
ii) drying the wet fabric at a temperature ranging from ambient temperature to about 150° C. for from about 5 minute to about 180 minutes; and
iii) optionally, applying the coating composition onto the dried fabric of step ii) or rinsing the dried fabric of step ii), and drying by repeating step ii);
wherein
the step iii) is optionally repeated several times to obtain a treated fabric containing suitable amount of the adhesion aid;
the coating composition comprises an adhesion aid and a solvent;
the solvent is methanol, ethanol, 2-propanol, dichloromethane, chloroform, tetrahydrofuran, or mixtures thereof;
the adhesion aid comprises polycarbonate oligomers having an average molecular weight of about 6500 or less; and
the amount of the adhesion aid in the coating composition is from about 1 weight % to about 20 weight %, based on the total weight of the coating composition.

7. The thermoplastic composite laminate of claim 6, wherein the method for applying the coating composition onto the untreated fabric is dipping, soaking, immersing, or spraying.

8. The thermoplastic composite laminate of claim 6, wherein the areal density of the untreated fabric is from about 20 g/m² to about 660 g/m².

9. The thermoplastic composite laminate of claim 1 is manufactured by a method selected from hot pressing, thermal compression molding, autoclave molding, and double-belt hot melt pressing.

10. An article comprising the thermoplastic composite laminate of claim 1.

11. The article of claim 10, which is housing or a protective cover for a mobile electronic device, a shell for a luggage, a decorative part for an auto control panel, or a face sheet for a snowboard.

\* \* \* \* \*